United States Patent Office 2,746,944
Patented May 22, 1956

2,746,944

PROCESS FOR PREPARING VINYL HALIDE COPOLYMERS AND COPOLYMERS PRODUCED THEREBY

Marguerite Naps, Oakland, and Fred E. Condo, El Cerrito, Calif., assignors to Shell Development Company, San Francisco, Calif., a corporation of Delaware No Drawing. Application October 16, 1950, Serial No. 190,446

1 Claim. (Cl. 260—45.5)

This invention relates to the copolymerization of vinyl halides with other polymerizable organic compounds. More particularly, the invention relates to a process for preparing a new kind of copolymer from the vinyl halides and dissimilar polymerizable organic compounds, and to the resulting copolymers.

Specifically, the invention provides a process for producing new vinyl halide copolymers whose structure and properties are entirely different from those of the conventional type of copolymer, which comprises heating the monomeric vinyl halide in a liquid medium which is a relatively poor solvent for the resulting vinyl halide homopolymer and in the presence of a peroxide catalyst until there is substantially no monomeric vinyl halide remaining in the reaction mixture and then adding the desired dissimilar polymerizable unsaturated organic compound to the resulting mixture and continuing the polymerization. The invention further provides novel copolymers produced by the above-described process.

Attempts have been made in the past to improve the properties of the homopolymers of the vinyl halides by copolymerizing the vinyl halide monomers with various polymerizable compounds whose homopolymers display the desired superior properties. This copolymerization has been accomplished by mixing the vinyl halide monomer with the desired dissimilar polymerizable monomer and subjecting the resulting mixture to polymerization conditions. When combined under these conditions the two dissimilar monomers added to the polymer nuclei in a more or less random fashion and the resulting polymer chains are made up of a very complicated arrangement of two monomer units. Copolymers prepared from vinyl chloride and methyl methacrylate by this method, may, for example, contain polymer chains having the monomer units arrangement in some such order as

ABBAABAABBAABBBAAB wherein A and B represent the vinyl halide and methyl methacrylate units. This method of producing the desired copolymers is not entirely satisfactory. It has been found that when the monomer units are distributed throughout the polymer chains in the above-described manner they fail to impart the properties of their corresponding homopolymers and the resulting copolymers in many cases possess an entirely different set of properties. Furthermore, as there is usually no definite control over the order in which the monomers add to the polymer chain the copolymers produced by this process rarely, if ever, have the identical molecular structure and standardization of the copolymers and their applications are quite difficult.

It is, therefore, an object of the invention to provide a process for producing a new kind of copolymer of the vinyl halides. It is a further object to provide a process for producing vinyl halide copolymers which possess many of the characteristic properties of the homopolymers of the individual monomers making up the said copolymer. It is a further object to provide a process for producing vinyl halide copolymers which have a substantially homogeneous composition. It is still a further object to provide vinyl halide copolymers which have an entirely different type of molecular structure from that found in the conventional type of copolymer. It is a further object to provide novel copolymers of the vinyl halides which have many unusual and beneficial properties. It is a further object to provide novel vinyl halide copolymers which have many of the characteristic properties of the homopolymers of the individual monomers making up the said copolymer. It is still a further object to provide vinyl halide copolymers which can be utilized in the usual applications without the addition of plasticizers. These and other objects of the invention will be apparent from the detailed description given hereinafter.

It has now been discovered that these and other objects may be accomplished by the process of the invention which comprises heating the monomeric vinyl halide in a liquid medium which is a relatively poor solvent for the resulting vinyl halide homopolymer and in the presence of a peroxide catalyst until there is substantially no monomeric vinyl halide remaining in the reaction mixture and then adding the desired dissimilar polymerizable unsaturated organic compound to the resulting mixture and continuing the polymerization.

The process of the invention is based on the discovery that when vinyl halide polymer chains are heated in the presence of a peroxide catalyst the catalyst attacks the side of the said polymer chains to form polymer free radicals and when a dissimilar monomer is added to the reaction mixture containing these radicals the said dissimilar monomers add to the polymer chains in the ordinary manner. The resulting product is thus a branched chain copolymer made up of distinct sections, one section comprising the original vinyl halide polymer chain and the other section or sections joined thereto being made up of the dissimilar monomer units. As the monomers are grouped together in separate sections and not distributed throughout the entire polymer chain as in the conventional type copolymers, the said monomers are able to impart a greater portion of the properties of their corresponding homopolymers and the final product possess properties which are more closely related to those of the homopolymers of the monomers utilized in their production.

An important application of the process of the invention is its use in the production of "internally" plasticized polymers, i. e., polymers wherein the plasticizer is joined to the said polymer by a primary chemical bond. The production of this type of copolymer is accomplished by employing as the dissimilar monomer in the above-described process a compound which is known to form a soft, flexible polymer, such as vinyl acetate. The resulting copolymer will retain many of the desired properties of the vinyl halide homopolymer due to the presence within the copolymer macromolecules of the large section of vinyl halide units, but it will also be more flexible than these vinyl halide homopolymers due to the presence of the segment or segments of the plasticizing monomer.

Any of the vinyl halides, such as vinyl chloride, vinyl bromide, vinyl iodide and vinyl fluoride, may be used in the production of the novel copolymer. Vinyl chloride is generally the more preferred.

The component to be copolymerized with the vinyl halides may be any dissimilar polymerizable unsaturated organic compound containing a $>C=C<$ group in its molecule, such as maleic acid, maleic acid esters, tetrahaloethylenes, etc. Preferred monomers to be copolymerized with the vinyl halides are those containing a single $CH_2=C=$ group in their molecule, such as methyl methacrylate, allyl acetate, vinyl acetate, butyl acrylate, allyl propionate, vinyl benzoate, styrene, dichlorostyrene, acrylonitrile, methacrylonitrile, vinylidene chloride, vinylidene bromide, vinyl phenol, acrylic acid, alpha-butyl acrylic acid, vinyl methyl ether, allyl chloride, methallyl chloride, allyl methyl ketone, allyl butyl ketone, and the like.

Particularly preferred monomers to be copolymerized with the vinyl halides are the esters of the aliphatic carboxylic acids containing a polymerizable ethylenic linkage, such as methyl methacrylate, butyl methacrylate, allyl acetate, allyl propionate, allyl butyrate, vinyl acetate, vinyl butyrate, vinyl methyl phthalate, allyl methyl phthalate, vinyl benzoate, butyl acrylate, vinyl chloroacetate, vinyl laurate, allyl valerite, and the like. A special group of such esters comprise the alkenyl esters of the aliphatic monocarboxylic acids containing from 1 to 15 carbon atoms.

Coming under special consideration as the copolymerizable monomers are the ethylenically unsaturated nitriles, particularly the alpha,beta-monoethylenically unsaturated aliphatic nitriles, such as acrylonitrile, methacrylonitrile, alpha-butyl acrylonitrile, alpha-chlorobutyl acrylonitrile, and the like.

The process of the invention may be accomplished in any liquid medium which is a relatively poor solvent for the vinyl halide polymer which is formed during the initial stages of the process. The vinyl halide polymers are usually insoluble in water so the polymerization may be conducted in either an aqueous emulsion or suspension system. The polymers are also generally insoluble in solvents, such as cyclohexane, benzene, toluene, cyclohexanone, and heptane, or mixtures thereof, or are insoluble in the monomers themselves, and these mediums may be also be utilized if desired.

The process is preferably accomplished in an aqueous emulsion. Emulsifying agents that may be employed in this preferred process include the soaps, such as sodium, potassium and ammonium myristate, laurate, palmitate, oleate, stearate, rosinate and hydroabietate; the alkali methyl alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof, and salts of higher amines as lauryl amine hydrochloride and stearyl amine hydrobromide. The amount of the emulsifying agent to be employed may vary over a considerable range but in most cases will vary between 0.1% to 5% by weight of monomer. Preferred amounts of emulsifying agent vary between 0.1% to 2% by weight of monomer.

In the first step of the process, the vinyl halide monomer is added to the selected liquid medium and polymerized in the presence of a peroxide polymerization catalyst. Peroxide catalysts to be utilized are those containing a peroxide —O—O— linkage in their molecule, such as benzoyl peroxide, hydrogen peroxide, acetyl peroxide, ditert-butyl peroxide, persulfuric acid, peracetic acid, perphthalic acid, potassium persulfate, tert-butyl perbenzoate, cumene hydroperoxide, tert-butyl hydroperoxide, monochloro-ditertiary butyl peroxide, tert-butyl tert-amyl peroxide, 2,2-bis(tert-butyl peroxy) butane, tert-butyl perpelargonate, and the like.

The amount of the catalyst added should be sufficient to initiate the polymerization of the vinyl halide monomers and attack the resulting polymer chains to form the polymer free radicals. In general, the amount of the catalyst added will vary between 0.1% to 4% by weight of material being polymerized. Preferred amounts of catalyst range from 1% to 3% by weight. The catalyst may be charged at the beginning of the reaction or it may be added continuously or in increment throughout the course of the reaction for the purpose of maintaining a more uniform concentration of the catalyst in the reaction mixture.

Temperatures employed in the polymerization of the vinyl halide monomer may vary considerably and will depend chiefly upon the type of catalyst selected. In general, temperatures vary between 35° C. to 100° C. Preferred temperatures range from 35° C. to 60° C. Atmospheric, superatmospheric, or subatmospheric pressures may be utilized as desired.

The polymerization of the vinyl halide monomer is continued until there is substantially no unpolymerized monomer present in the reaction mixture. This may be accomplished by continuing the polymerization until it appears that substantially all of the monomer has been consumed, or alternatively, by interrupting the polymerization during the final stages and removing the unpolymerized monomer from the reaction mixture by conventional means. A polymerization of 100% of the monomer, or a complete removal of all of the unpolymerized monomer is usually quite difficult to obtain as in many cases some of the monomer will be retained within the polymer, etc. Therefore, the expression "substantially all" as used throughout the specification and claims in regard to the polymerization of the initial monomer, or to the removal of the unpolymerized initial monomer from the reaction mixture is meant such a complete removal or polymerization as can generally be accomplished, e. g., a polymerization of at least 94% of the initial monomer, or a removal of all but 6% or less of the unpolymerized monomer.

After the reaction mixture containing the vinyl halide polymer has been substantially freed of monomer the dissimilar monomer, i. e., the dissimilar polymerizable unsaturated organic compound containing the polymerizable >C=C< group, is then added to the reaction mixture. The monomer added may be a single dissimilar polymerizable unsaturated organic compound or a mixture of two or more of such compounds. The monomer or monomers are preferably deoxygenated before being added to the reaction mixture containing the vinyl halide polymer.

The dissimilar monomer or monomers may be added all at one time or may be added intermittently or continuously over a period of time. In some cases it may be desirable to add the dissimilar monomer at the rate at which it is consumed in the reaction.

The amount of the dissimilar monomer added will depend upon the ratio in which the said monomers are desired in the final product. Thus, for example, if the desired product is a copolymer of 75% poly(vinyl chloride) and 25% poly(methyl methacrylate) the amount of the methyl methacrylate added to the mixture containing the active poly(vinyl chloride) will be about one quarter that of the active polymer.

The conditions employed in the reaction after the addition of the dissimilar monomer may vary. In general, the presence of factors, such as ultra-violet light, which tend to initiate polymerization but have little or no tendency to form polymer free radicals by attacking the polymer chain should be avoided as they give rise to the formation of contaminating homopolymers of the added monomers. The use of high temperatures should also be avoided to prevent undesirable degradation of the vinyl halide polymer and, if the added dissimilar monomer is thermally polymerizable, to avoid formation of homopolymers through thermal polymerization. It is also desirable to employ temperatures below that of the decomposition temperature of the catalysts present in the reaction mixture. In general, temperatures ranging from 10° C. to 40° C. give satisfactory results. Preferred temperatures to be used with the thermally polymerizable monomers vary from about 10° C. to 30° C.

It is usually preferred to accomplish the polymerization of the added dissimilar monomer in the absence of molecular oxygen, at least during the initial stages of the reaction. In some cases it may be desirable to replace the withdrawn oxygen with an inert gas, such as nitrogen, methane, carbon dioxide and the like. Atmospheric, superatmospheric, and subatmospheric pressures may be employed in this latter stage of the polymerization.

It also may be desirable to add various additives before or during the polymerization of the vinyl halide monomer or the dissimilar monomer. These additives include emulsion stabilizers, lubricants, dyes, plasticizers, and the like. The type and amount of the additive will depend upon the monomers employed and the intended use of the final product and can best be selected for each individual case.

At the completion of the reaction the copolymers may be separated from the reaction mixture by any suitable means, such as filtration, solvent extraction, coagulation by electrolytes, solvents, freezing, and the like.

The process of the invention may be accomplished in any suitable apparatus. The emulsion polymerization process is preferably accomplished in a glass or glass-lined vessel provided with means for agitating the contents thereof. Generally rotary stirring devices are the most effective means of insuring the intimate contact of the reagents, but other methods may be successfully employed.

For clarity, the process has been described above as comprising the addition of only the vinyl halide monomer at the start of the initial polymerization step but it is within the scope of the invention to add minor quantities, e. g., 30% or less, or other polymerizable monomers containing a polymerizable >C=C< group, such as vinyl acetate, allyl acetate, allyl chloride, methyl acrylate, butyl methacrylate, acrylic acid, methacrylic acid, styrene, methyl styrene, dichlorostyrene, acrylonitrile, methacrylonitrile, and the like. When modified in this manner, the process of the invention will produce the same type of product produced above with the exception that the segment in the copolymer molecule comprising the homopolymer of the vinyl halide will be replaced by a segment comprising a vinyl halide polymer containing minor quantities of the aforedescribed monomers.

The copolymers produced by the process of the invention will have properties closely related to those of the homopolymers of the monomers contained in the said copolymers. As the properties may be conveniently predicted in most cases by a proper selection of monomers the copolymers may be produced to fit substantially any desired industrial application. In general, resins prepared from the said copolymers, may be cut, milled, and machined to produce various rigid articles of commerce, such as table tops, containers, toys, buttons, combs, etc. In the molten state or solvent solution the copolymers may be utilized in the preparation of impregnating agents, laminating agents, surface coatings, and the like. They may also be subjected to extrusion and to injection and compression molding in the presence or absence of added diluents. The new internally plasticized copolymers described above are of particular utility in the fabrication of flexible films for various wrapping applications, especially food products, because of the absence of the deleterious volatile plasticizers usually employed in the conventional copolymers.

To illustrate the manner in which the invention may be carried out the following examples are given. It is to be understood, however, that the examples are for the purpose of illustration and the invention is not to be regarded as limited to any of the specific compounds or conditions cited therein. Unless otherwise specified, parts disclosed in the examples are parts by weight.

EXAMPLE I

A series of vinyl chloride-methyl methacrylate copolymers covering a wide range of monomer ratios was prepared in the following manner. The desired quantity of vinyl chloride was added to an alkaline sodium lauryl sulfate-potassium persulfate emulsion system and heated at 40° C. After a polymer conversion of about 90% had been reached, the vinyl chloride monomer was bled from the reduction vessel and deoxygenated methyl methacrylate monomer was pressured into the said vessel with oxygen-free nitrogen gas. Polymerization was continued at 40° C. for an additional six hours and then the copolymers were recovered by freezing. The polymerization data for the various runs are summarized in the table below:

*Polymerization formula*

| Monomer Ratio, VC:MMA [1] | (Parts per hundred parts of total monomer, VC+MMA) | | | |
|---|---|---|---|---|
| | Potassium Persulfate | Sodium Lauryl Sulfate | NaOH | Water |
| 85:15 | 0.90 | 0.61 | 0.24 | 485 |
| 81:19 | .73 | .48 | .19 | 380 |
| 80:20 | .86 | .57 | .23 | 460 |
| 54:46 | .81 | .54 | .21 | 430 |
| 36:64 | .90 | .61 | .24 | 485 |
| 33:67 | .83 | .55 | .22 | 455 |

[1] VC=vinyl chloride; MMA=methyl methacrylate.

An analysis of the physical behavior of the products produced above indicates that they are copolymers composed of methyl methacrylate segments chemically bound to the polyvinyl chloride chains. The physical properties of the said copolymers are quite different from those of the homopolymers of vinyl chloride or methyl methacrylate or of the conventional copolymers of these two monomers.

As indicated in the following table, all of the above-described copolymers possessed a more rapid rate of flow under extrusion at 150° C. and 3000 p. s. i. than that of either the vinyl chloride homopolymer or methyl methacrylate homopolymer. (The homopolymers were prepared under the same polymerization conditions which were employed for the formation of the copolymers.)

| Monomer Ratio, VC:MMA | Flow at 150° C. and 300 p. s. i. | |
|---|---|---|
| | Inches | Seconds |
| 100:0 | 0.94 | 120 |
| 85:15 | 1.37 | 120 |
| 81:19 | 1.50 | 85 |
| 80:20 | 1.50 | 70 |
| 54:46 | 1.50 | 120 |
| 36:64 | 1.19 | 120 |
| 0:100 | .55 | 120 |

As indicated below, the novel copolymers produced above also possess greater solubility in solvents, such as methyl ethyl ketone, which are relatively poor solvents for the vinyl chloride homopolymer.

| Monomer Ratio, VC:MMA | Solubility in MEK (5% Solutions) [1] | |
|---|---|---|
| | Percent Dissolved | Wt. Ratio, Gel/Resin |
| 100:0 | 2.9 | 11.7 |
| 85:15 | 8.6 | 12.1 |
| 81:19 | 28.5 | 13.1 |
| 54:46 | 34.3 | 10.9 |

[1] Solubility measurements made for 5% wt. solutions (0.35 g. resin in 8.25 cc. MEK). The solutions were rotated for 72 hours at room temperature and then centrifuged for 20 minutes at 1,700 R. P. M.

EXAMPLE II

About 100 parts of vinyl chloride is added to a mixture containing about 400 parts of water, 0.5 part of sodium lauryl sulfate, 0.5 part of sodium hydroxide and 0.9 part of potassium persulfate and the resulting mixture heated to 40° C. After a polymer conversion of about 80% has been reached, the vinyl chloride monomer is bled from the reaction vessel about 20 parts of deoxygenated vinyl acetate pressured into the reaction vessel with oxygen-free nitrogen gas. Polymerization is then continued to completion at 35° C. and the resulting copolymer recovered by freezing.

The copolymer produced above possesses good flexibility and in addition possesses many of the desirable characteristics of the vinyl chloride homopolymer not possessed by the conventional copolymer of 80% vinyl chloride and 20% vinyl acetate.

EXAMPLE III

About 100 parts of vinyl chloride is added to a mixture containing 400 parts of water, 0.5 part of sodium lauryl sulfate, 0.5 part of trisodium phosphate and 1 part of potassium persulfate and the resulting mixture heated to 40° C. After a polymer conversion of about 90% has been reached, the vinyl chloride is bled from the reaction vessel and about 10 parts of deoxygenated acrylonitrile pressured into the reaction vessel. Polymerization is then continued until the acrylonitrile is completely polymerized. The resulting copolymer is recovered by freezing. Analysis shows the product to be made up of acrylonitrile segments chemically bonded to the polyvinyl chloride chains.

EXAMPLE IV

About 75 parts of vinyl chloride is added to a mixture containing 400 parts of water, 0.5 part of sodium lauryl sulfate, 0.5 part of sodium hydroxide and 1 part of benzoyl peroxide and the resulting mixture heated to 50° C. to polymerize the said vinyl chloride. When it appears that no more vinyl chloride remained in the mixture, about 25 parts of vinylidene chloride is pressured into the reaction vessel with oxygen-free nitrogen gas. Polymerization is then continued until the vinylidene chloride is completely polymerized. The resulting copolymer is recovered by freezing. Analysis shows that the resulting product differs widely in its chemical and physical properties from a copolymer of vinyl chloride and vinylidene chloride prepared by the conventional copolymerization process.

We claim as our invention:

A process for copolymerizing vinyl chloride and methyl methacrylate which consists of adding monomeric vinyl chloride to an aqueous emulsion consisting of water, from 0.1% to 5% by weight of an alkali metal alkyl sulfate as the emulsifying agent, and from 0.1% to 5% by weight of potassium persulfate, heating the mixture at a temperature between 35° C. and 60° C. at a pressure at which the vinyl halide is in the liquid state until a greater part of the vinyl chloride has been polymerized, removing the unpolymerized vinyl chloride, and then, without increasing the amount of emulsifying agent, adding deoxygenated methyl methacrylate to the resulting mixture and continuing the polymerization in the dark at a temperature not in excess of 40° C. and a pressure not substantially in excess of atmospheric pressure until the methyl methacrylate has been polymerized.

References Cited in the file of this patent

UNITED STATES PATENTS

| | | |
|---|---|---|
| 2,310,132 | Underdahl | Feb. 2, 1943 |
| 2,520,959 | Powers | Sept. 5, 1950 |
| 2,538,779 | Harrison et al. | Jan. 23, 1951 |
| 2,569,954 | Ruebensaal | Oct. 2, 1951 |

FOREIGN PATENTS

| | | |
|---|---|---|
| 604,708 | Great Britain | July 8, 1948 |

OTHER REFERENCES

Carlin et al.: Journal American Chemical Society, September, 1950, vol. 72, Number 9, pages 4200 to 4203.

Carlin et al.: Journal American Chemical Society, vol. 68, page 876, May, 1946.